UNITED STATES PATENT OFFICE.

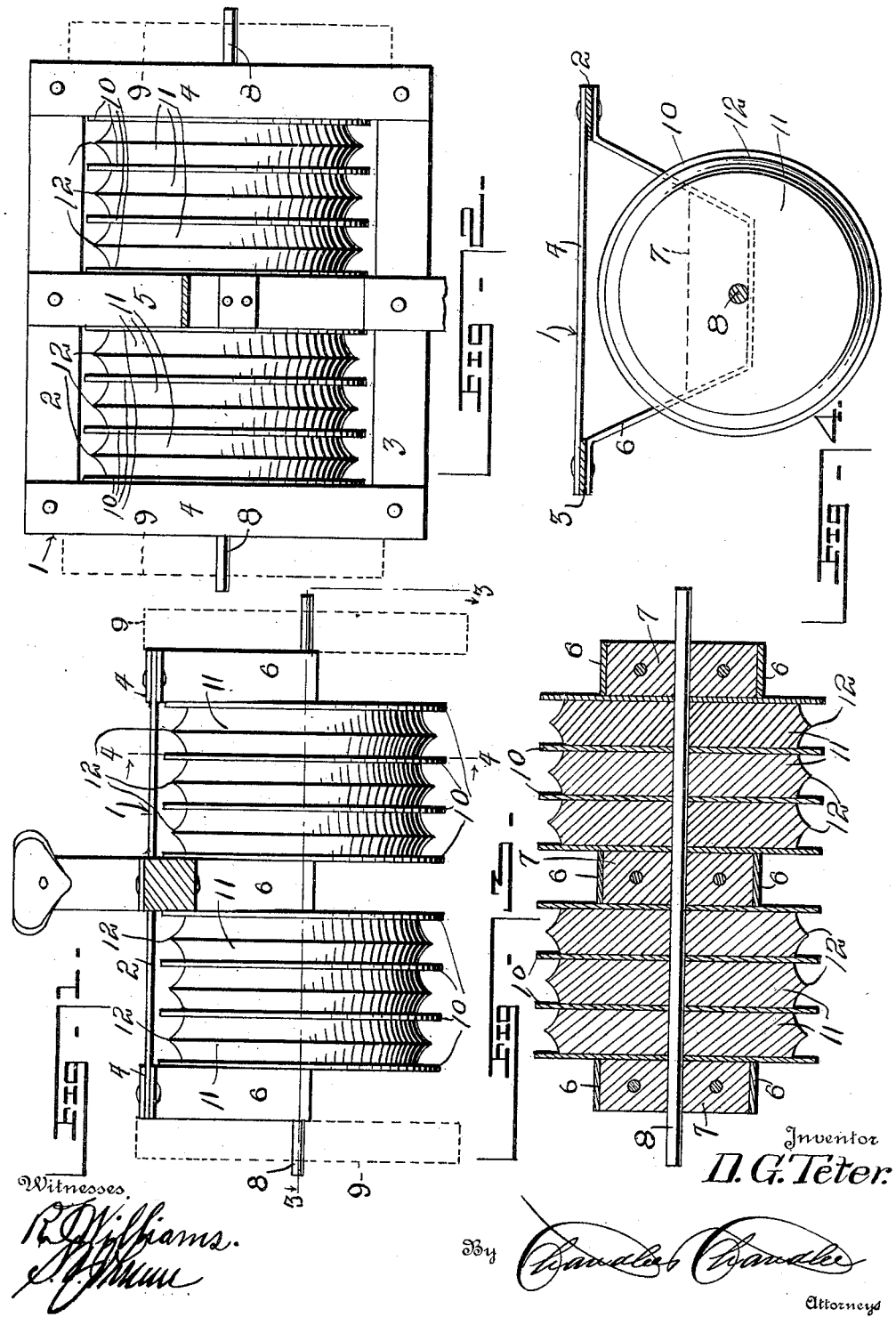

DAVID G. TETER, OF NOKOMIS, ILLINOIS.

COMBINED CLOD CUTTER AND CRUSHER.

1,103,450.

Specification of Letters Patent. Patented July 14, 1914.

Application filed November 26, 1913. Serial No. 803,231.

*To all whom it may concern:*

Be it known that I, DAVID G. TETER, a citizen of the United States, residing at Nokomis, in the county of Montgomery, State of Illinois, have invented certain new and useful Improvements in Combined Clod Cutters and Crushers; and I do hereby declare the following to be a full, clear, and exact description of the invention, such as will enable others skilled in the art to which it appertains to make and use the same.

The present invention is directed to combined clod cutters and crushers, and has for its object to construct a device of this character which will, when moved across a field, effectually cut and crush the earth.

A further object of the invention is to so construct a device of this character that it may be used with equal success for cutting sod.

With these and other objects in view, this invention resides in the novel features of construction, formation, combination and arrangement of parts to be hereinafter more fully described, claimed and illustrated in the accompanying drawing, in which:—

Figure 1 is a front elevation of the device. Fig. 2 is a top plan view. Fig. 3 is a sectional view on line 3—3 of Fig. 1. Fig. 4 is a similar view on line 4—4 of Fig. 1.

Referring to the drawing, the numeral 1 designates a frame, which consists of front and rear bars 2 and 3, said bars being connected by side bars 4 and an intermediate bar 5. Supported by the frame 1 are three hangers 6, which are provided with boxes 7 for supporting the shaft 8, the ends of which project beyond the outermost hangers 6 so that wheels 9, shown in dotted lines, may be placed upon the projected ends when it is desired to move the machine from field to field. Rotatably mounted upon the shaft 8 is a plurality of cutting disks 10, the number of which may be varied as desired. Also rotatably mounted upon the shaft 8 are crushing disks 11 which have their peripheries formed with circumferential ribs 12.

It will be noted that the peripheries of the ribs 12 are arranged inwardly of the cutting edges of the disk 10 so that when the machine is being moved across a field, the clods will be subjected to the cutting action of the disk 10, after which the cut clods will be subjected to the action of the crushing disks 11, thus thoroughly breaking the clods. Further it will be noted that the machine may be used for cutting sod into strips, owing to the fact that the cutting edges of the disk 10 extend beyond the periphery of the ribs 12.

What is claimed is:—

In a device of the class described, in combination with a frame, of hangers supported by the frame, a shaft supported by the hangers, a plurality of cutting disks rotatably mounted upon the shaft, a plurality of crushing disks rotatably mounted upon the shaft and between the cutting disks, said crushing disks having circumferential ribs formed thereon, the cutting edges of said disks extending beyond the periphery of said ribs, as and for the purpose set forth.

In testimony whereof, I affix my signature, in the presence of two witnesses.

DAVID G. TETER.

Witnesses:
H. F. GROTE,
L. WADDINGTON.

Copies of this patent may be obtained for five cents each, by addressing the "Commissioner of Patents, Washington, D. C."